United States Patent
Liu et al.

(10) Patent No.: US 9,090,744 B2
(45) Date of Patent: Jul. 28, 2015

(54) PROCESS FOR PREPARING POLYSULFONE

(71) Applicant: BEIJING NORMAL UNIVERSITY, Beijing (CN)

(72) Inventors: Zhengping Liu, Beijing (CN); Jing Wang, Beijing (CN)

(73) Assignee: BEIJING NORMAL UNIVERSITY, Beijing (CN)

( * ) Notice: Subject to any disclaimer, the term of this patent is extended or adjusted under 35 U.S.C. 154(b) by 0 days.

(21) Appl. No.: 14/346,635

(22) PCT Filed: Sep. 24, 2012

(86) PCT No.: PCT/CN2012/081860
§ 371 (c)(1),
(2) Date: Mar. 21, 2014

(87) PCT Pub. No.: WO2013/041062
PCT Pub. Date: Mar. 28, 2013

(65) Prior Publication Data
US 2014/0221596 A1    Aug. 7, 2014

(30) Foreign Application Priority Data
Sep. 23, 2011    (CN) .......................... 2011 1 0286532

(51) Int. Cl.
*C08G 8/02*    (2006.01)
*C08G 75/20*    (2006.01)
*C08G 75/23*    (2006.01)

(52) U.S. Cl.
CPC ............... *C08G 75/20* (2013.01); *C08G 75/23* (2013.01)

(58) Field of Classification Search
CPC .............................. C08G 75/20; C08G 75/23
USPC ......... 528/125, 126, 128, 173, 176, 179, 182, 528/193, 194; 525/471
See application file for complete search history.

(56) References Cited

U.S. PATENT DOCUMENTS

2007/0231647 A1*   10/2007   Ohno .............................. 429/30
2012/0149796 A1*    6/2012   Weber et al. .................. 521/180

OTHER PUBLICATIONS

PCT, International Search Report in PCT/CN2012/081860, Dec. 27, 2012, 3 pages.

*Primary Examiner* — Shane Fang

(57) ABSTRACT

The present invention relates to a process for preparing polysulfone, comprising reacting bisphenol monomers with a salt forming agent to form bisphenolate, followed by subjecting the bisphenolate and 4,4'-dihalodiphenyl sulfone to polycondensation to give polysulfone, characterized in that the reaction for forming bisphenolate and the polycondensation are performed in the presence of a composite ionic liquid as the solvent, the composite ionic liquid containing zwitterionic liquid of formula (I) and/or (II) as component A and ionic liquid of formula (III) and/or (IV) as component B, wherein variables are respectively defined in the description of the present invention. The process of the present invention enables a shortened preparation period of polysulfone, particularly a shortened reaction time (including the time of water removal) of the salt forming stage; in addition, the polysulfone thus prepared has an improved molecular weight which is much higher.

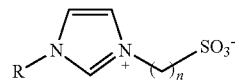

(I)

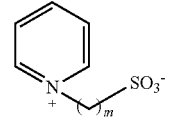

(II)

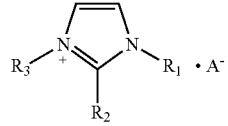

(III)

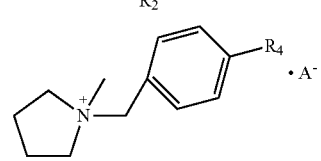

(VI)

21 Claims, 1 Drawing Sheet

PROCESS FOR PREPARING POLYSULFONE

FIELD OF THE INVENTION

The present invention relates to a process for preparing polysulfone, more particularly, a process for preparing polysulfone by using a composite ionic liquid as the solvent.

BACKGROUND ART

Polysulfone is a special engineering plastics of great importance, which has long been used as a strategic national defense industry material ever since its successful development. Bisphenol A polysulfone PSF is a type of polysulfone resin with the maximum yield, the main chain of molecules of which consists of isopropylene, ether bond, sulfuryl and phenylene. These groups endow this type of polymer with excellent high-temperature resistance and remarkable mechanical properties. Therefore, bisphenol A polysulfone PSF is widely applied in many fields such as aviation, aerospace, national defense, electronics, electrics, medical treatment, nuclear power, oil well, ships, magnetic wires, military industry, automobile manufacture and food processing, etc.

Polysulfone is usually synthesized in industry by the method of double-feeding, which requires two reaction vessels, i.e., a salt forming kettle and a reaction kettle. Bisphenol A firstly reacts with a sodium hydroxide solution in dimethyl sulfoxide as the solvent to generate bisphenol A sodium salt, at the end of the salt forming reaction, the water entrainer is distilled off, then the resultant solid 4,4'-dichlorodiphenyl sulfone is added under the protection of nitrogen gas and stirred, followed by gradually increasing the temperature for polycondensation under 150 to 160° C. to generate polysulfone, where the polymerization lasts for about 3 h (which is controlled by viscosity). The polymerization involves complicated steps, a complex process, a long reaction time, and a high energy consumption. The salt forming reaction lasts for a long time, and the temperature inside the reaction kettle reaches 160° C. at the end of salt formation. To ensure that the polycondensation in the next step is not too violent, it is necessary to firstly reduce the temperature to 120° C., then increase the temperature for polycondensation; moreover, water formed from the salt forming stage should be removed from the system so as to inhibit decrease in monomer concentration and the side reaction of hydrolysis of halogen-containing monomer under high temperatures, and thus enough time for water removal should be guaranteed, normally between 2.5 to 8.5 h, as a result, the whole period from the beginning of the salt forming reaction to the completion of polycondensation takes as long as 18 h. In addition, the feeding hole needs to be opened for double-feeding, thereby the residual toluene vapor after water removal escapes from the reaction kettle, which is likely to cause damages to operators and pollute the air. The polycondensation in the above industrial synthesis process belongs to solution polymerization. In the later stage of the solution polymerization, the system viscosity is high, thus the after-treatment is in need of the addition of a large amount of organic solvent to reduce the viscosity. However, use of organic solvent in a large amount not only wastes energy and contaminates the environment, but also increases industrial costs. In addition, due to restrictions on solubility and boiling point of the organic solvent, the solvent type is very limited, most of them being sulfones. This type of solvent is often toxic, quite harmful. Finally, the industrial product obtained by the industrial synthesis process hereinabove has a low molecular weight. A product manufactured by Shanghai Shuguang Chemical Plant, which prepared the early polysulfone domestically, has a molecular weight of 20,610 to 27,840.

Ionic liquid, which replaces the traditional organic solvent as the reaction medium, has prominent advantages. For example, it is non-volatile, with a negligible vapor pressure and an excellent thermostability, and is easy for recycling. Furthermore, the ionic liquid can be adapted to different polycondensation systems due to the designability of its substance structure and natures. As currently reported, the ionic liquid has been successfully applied to polymerizations like active polymerization, controllable free radical polymerization, anionic and cationic polymerization, polycondensation (limited to synthesis of polyester, polyamide, polyimide, etc). The application of ionic liquid in nucleophilic substitution polycondensation reaction for preparation of engineering plastics polysulfone has not been reported up to now.

SUMMARY OF THE INVENTION

In view of the state of the art, the inventors of the present invention performed an intensive research in the field of polysulfone preparation in order to find a process for preparing polysulfone in a short reaction time, particularly, a short reaction time in the salt forming stage, and the prepared polysulfone has an improved molecular weight which is much higher. It turned out that the aforementioned object could be achieved by preparing polysulfone in the presence of a composite ionic liquid as the solvent. The inventors completed the present invention based on the above discovery.

Therefore, the object of the present invention is to provide a process for preparing polysulfone with a short reaction time, in particular, a short reaction time in the salt forming stage (including the time of water removal), and the polysulfone thus prepared has an improved molecular weight which is much higher. The technical solution for achieving the object of the present invention can be summarized as follows:

1. A process for preparing polysulfone, comprising reacting bisphenol monomers with a salt forming agent to form bisphenolate, followed by subjecting the bisphenolate and 4,4'-dihalodiphenyl sulfone to polycondensation to give polysulfone, characterized in that the reaction for forming bisphenolate and the polycondensation are performed in the presence of a composite ionic liquid as the solvent, the composite ionic liquid containing:

A) at least one zwitterionic liquid selected from compounds of the following formulae I and II:

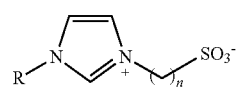

I

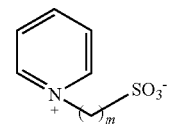

II wherein, n and m independently from each other are an integer of from 1 to 6, preferably 3 or 4; and R is a linear or branched $C_1$-$C_6$ alkyl group, preferably a linear or branched $C_1$-$C_4$ alkyl group, and B) at least one ionic liquid selected from compounds of the following formulae III and IV:

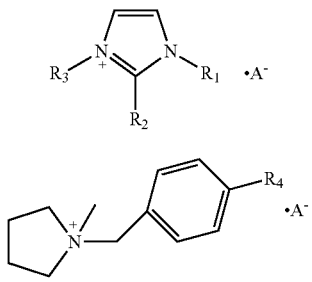

wherein,

A⁻ represents an anion in the ionic liquid, which is Cl⁻, Br⁻, $BF_4^-$, $PF_6^-$, $[CF_3SO_3]^-$, $(CF_3SO_2)_2N^-$, $CF_3COO^-$, $[AlCl_4]^-$, $(CF_3SO_2)_2C^-$, $CF_3CF_2CF_2SO_3^-$ or $CF_3CF_2CF_2COO^-$;

$R_1$ and $R_3$ independently from each other are linear or branched $C_1$-$C_{18}$ alkyl groups or benzyl;

$R_2$ is hydrogen or a linear or branched $C_1$-$C_4$ alkyl group; and $R_4$ is hydrogen, a linear or branched $C_1$-$C_6$ alkyl group, halogen or nitro, preferably the composite ionic liquid containing the compound of formula I as the ionic liquid of component A and the compound of formula III or IV as the ionic liquid of component B.

2. The process as described in Item 1, in which the bisphenol monomer is hydroquinone and/or bisphenol A compound of the following formula V:

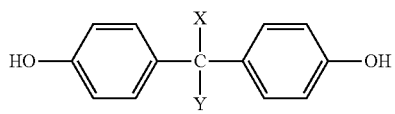

wherein, X and Y are identical or different and independently from each other are H, a linear or branched $C_1$-$C_5$ alkyl group, or a linear or branched $C_1$-$C_5$ alkyl group mono- or polysubstituted by halogen, such as trifluoromethyl, preferably the bisphenol monomer is one or more selected from a group of hydroquinone, bisphenol A, bisphenol AF, bisphenol F, bisphenol S, 6,6-bis(4'-hydroxyphenyl)-undecane and 2,2-bis(4'-hydroxyphenyl)hexane.

3. The process as described in Item 1 or 2, in which the salt forming agent is one or more selected from a group of potassium carbonate, sodium carbonate, potassium hydroxide and sodium hydroxide; preferably from potassium carbonate, sodium carbonate or a mixture of potassium carbonate and sodium carbonate, with the molar ratio of the salt forming agent to the bisphenol monomer being 1:1 to 2:1, in particular 1.05:1 to 1.3:1.

4. The process as described in any of Items 1 to 3, wherein 4,4'-dihalodiphenyl sulfone is 4,4'-dichlorodiphenyl sulfone, 4,4'-difluorodiphenyl sulfone or a mixture thereof.

5. The process as described in any of Items 1 to 4, in which the ionic liquid as the component A is one or more selected from a group of methylimidazolium n-butylsulfonate (Mimbs), methylimidazolium n-propylsulfonate (Mimps), n-butylimidazolium n-butylsulfonate (Bimbs), pyridinium n-butylsulfonate (Pyrbs) and pyridinium n-propylsulfonate (Pyrps); and/or the ionic liquid as the component B is one or more selected from a group of 1-isopropyl-3-methylimidazolium hexafluorophosphate (i-pmim $PF_6$), 1-isopropyl-3-methylimidazolium tetrafluoroborate (i-pmim $BF_4$), 1-ethyl-3-methylimidazolium hexafluorophosphate (emim $PF_6$), 1-n-propyl-3-methylimidazolium hexafluorophosphate (pmim $PF_6$), 1-n-butyl-3-methylimidazolium hexafluorophosphate (bmim $PF_6$), 1-n-hexyl-3-methylimidazolium hexafluorophosphate ($C_6$mim $PF_6$), 1-n-octyl-3-methylimidazolium hexafluorophosphate ($C_8$mim $PF_6$), 1,3-di-n-butylimidazolium hexafluorophosphate (bbim $PF_6$) and 1-benzyl-3-methylimidazolium trifluoromethylsulfonate (bemim OTf).

6. The process as described in any of Items 1 to 5, wherein the process is carried out by a one-pot two-step method as follows:

i) reacting the bisphenol monomer with the salt forming agent in a reaction vessel in the presence of 4,4'-dihalodiphenyl sulfone, the composite ionic liquid and a water entrainer to form bisphenolate, removing the formed water from the system with the aid of the water entrainer simultaneously at the start of the salt forming reaction, or after the beginning of the salt forming reaction, or after the completion of the salt forming reaction; or reacting the bisphenol monomer with the salt forming agent in a reaction vessel in the presence of 4,4'-dihalodiphenyl sulfone and the composite ionic liquid to form bisphenolate, adding a water entrainer at the same time during the salt forming reaction or after the completion of the salt forming reaction to remove the formed water from the system; and ii) subjecting the bisphenolate and 4,4'-dihalodiphenyl sulfone to polycondensation in the water-removed mixture from step i) in the same reaction vessel used in step i) to obtain polysulfone.

7. The process as described in any of Items 1 to 6, wherein the water entrainer is an organic solvent which forms an azeotrope with water under the condition for bisphenolate formation, preferably toluene, chlorobenzene, cyclohexane, xylene or a mixture thereof.

8. The process as described in any of Items 1 to 7, wherein the molar ratio of 4,4'-dihalodiphenyl sulfone to the bisphenol monomer is 1:1 to 1:1.2.

9. The process as described in any of Items 1 to 8, wherein the mass ratio of the ionic liquid as component B to the ionic liquid as component A is 1:10 to 10:1, preferably 1:1 to 3:1, and/or the mass ratio of the total amount of the composite ionic liquid to the total amount of monomers is 1:1 to 3:1.

10. The process as described in any of Items 1 to 9, wherein the reaction of bisphenolate formation is performed under 140 to 160° C., and/or the polycondensation of bisphenolate and 4,4'-dihalodiphenyl sulfone is performed under 150 to 220° C.

11. The process as described in any of Items 1 to 10, wherein the total time of bisphenolate formation and water removal is 0.25 h to 4.5 h, preferably 0.25 to 1.0 h; and the time of polycondensation of bisphenolate and 4,4'-dihalodiphenyl sulfone is 0.5 to 4 h, preferably 0.8 to 1.5 h.

12. The process as described in any of Items 2 to 11, wherein the process is carried out by a one-pot two-step method as follows:

a) reacting the bisphenol A compound of formula V with potassium carbonate and/or sodium carbonate as the salt forming agent in a reaction vessel in the presence of 4,4'-difluorodiphenyl sulfone, the composite ionic liquid and a water entrainer to form bisphenolate, removing the formed water from the system with the aid of the water entrainer simultaneously at the start of the salt forming reaction, or after the beginning of the salt forming reaction, or after the completion of the salt forming reaction, or reacting the bisphenol A compound of formula V with potassium carbonate and/or sodium carbonate as the salt forming agent in a reaction vessel in the presence of 4,4'-difluorodiphenyl sulfone and the composite ionic liquid to form bisphenolate, adding a water entrainer at the same time during the salt forming reaction or after the completion of the salt forming reaction to remove the formed water from the system; and b) subjecting the bisphenolate and 4,4'-difluorodiphenyl sulfone to polycondensation in the water-removed mixture from step a) in the same reaction vessel used in step a) to obtain polysulfone, wherein, the composite ionic liquid contains the compound of formula I as the ionic liquid of component A and the compound of formula III or IV as the ionic liquid of component B; the mass ratio of the total amount of the composite ionic liquid to the total amount of monomers is 1:1 to 3:1; and the mass ratio of the ionic liquid as component B to the ionic liquid as component A is 1:1 to 3:1.

SPECIFIC MODES FOR CARRYING OUT THE INVENTION

Figure 1:
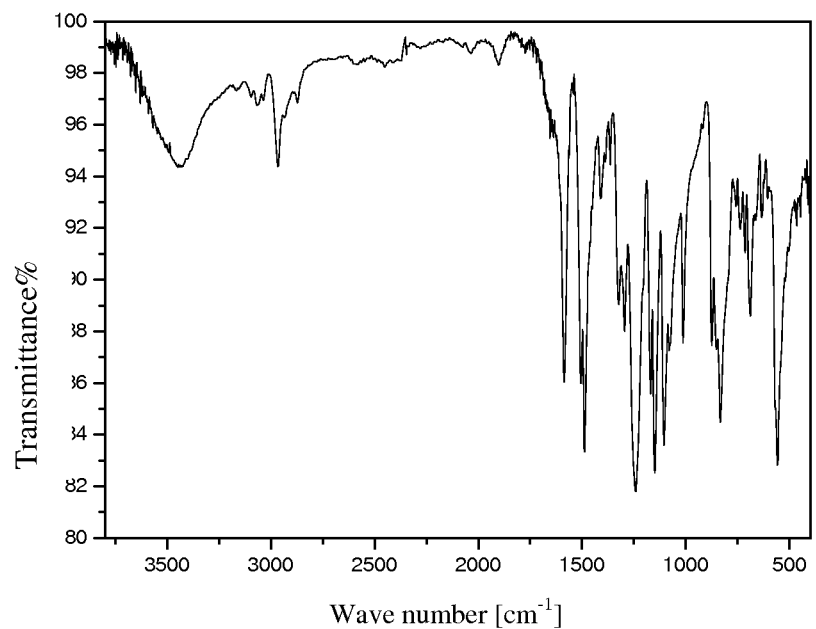
FIG. 1 is an infrared spectrum of bisphenol A polysulfone prepared in Example 1.

Based on one aspect of the present invention, it provides a process for preparing polysulfone, comprising reacting bisphenol monomers with a salt forming agent to form bisphenolate, followed by subjecting the bisphenolate and 4,4'-dihalodiphenyl sulfone to polycondensation to give polysulfone, characterized in that the reaction for forming bisphenolate and the polycondensation are performed in the presence of a composite ionic liquid as the solvent, the composite ionic liquid containing:

A) at least one zwitterionic liquid selected from compounds of the following formulae I and II:

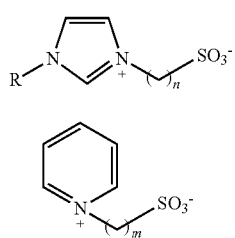

wherein,
n and m independently from each other are an integer of from 1 to 6, and
R is a linear or branched $C_1$-$C_6$ alkyl group,
and B) at least one ionic liquid selected from compounds of the following formulae III and IV:

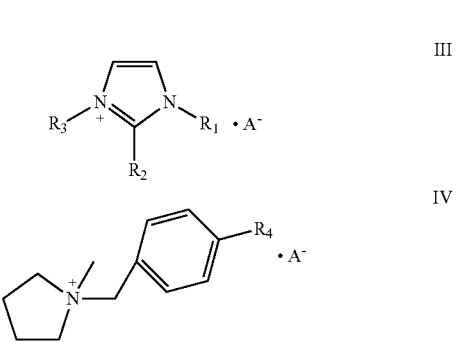

wherein,
$A^-$ represents an anion in the ionic liquid, which is $Cl^-$, $Br^-$, $BF_4^-$, $PF_6^-$, $[CF_3SO_3]^-$, $(CF_3SO_2)_2N^-$, $CF_3COO^-$, $[AlCl_4]^-$, $(CF_3SO_2)_2C^-$, $CF_3CF_2CF_2SO_3^-$ or $CF_3CF_2CF_2COO^-$;
$R_1$ and $R_3$ independently from each other are linear or branched $C_1$-$C_{18}$ alkyl groups or benzyl;
$R_2$ is hydrogen or a linear or branched $C_1$-$C_4$ alkyl group; and
$R_4$ is hydrogen, a linear or branched $C_1$-$C_6$ alkyl group, halogen or nitro.

Preparation of polysulphone by using the composite ionic liquid according to the present invention as the solvent, not only greatly shortens time required for the salt forming stage including the time of water removal, which in turn shortens the whole period of preparation, but also obtains polysulfone with a molecular weight higher than that of polysulphone obtained under similar conditions but using a conventional organic solvent. Not intending to be bound by any theory, use of the zwitterionic liquid as component A according to the present invention may obviously accelerate the salt forming reaction in the process of preparing polysulfone, so as to shorten the time of salt formation, and ultimately shorten the whole period of preparation; polycondensation based on the present invention is precipitation polymerization, use of the ionic liquid as component B, may reduce viscosity of the polymerization system, so as to improve the molecular weight of polysulfone.

The zwitterionic liquid as component A which may be used in the process of the present invention is at least one zwitterionic liquid selected from the compounds of the following formulae I and II:

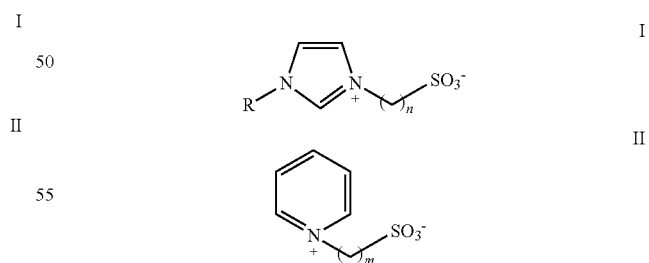

wherein,
n and m independently from each other are an integer of from 1 to 6, preferably 3 or 4; and
R is a linear or branched $C_1$-$C_6$ alkyl group, preferably a linear or branched $C_1$-$C_4$ alkyl group.

In the present invention, it is preferred that the composite ionic liquid contains the compound of formula I as the ionic liquid of the component A.

The ionic liquid as component B which may be used in the process of the present invention is at least one ionic liquid selected from the compounds of the following formulae III and IV:

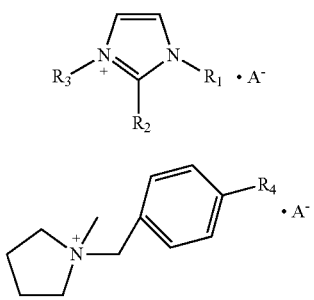

III

IV wherein, $A^-$ represents an anion in the ionic liquid, which is $Cl^-$, $Br^-$, $BF_4^-$, $PF_6^-$, $[CF_3SO_3]^-$, $(CF_3SO_2)_2N^-$, $CF_3COO^-$, $[AlCl_4]^-$, $(CF_3SO_2)_2C^-$, $CF_3CF_2CF_2SO_3^-$ or $CF_3CF_2CF_2COO^-$;

$R_1$ and $R_3$ independently from each other are linear or branched $C_1$-$C_{18}$ alkyl groups, preferably linear or branched $C_1$-$C_8$ alkyl groups, or benzyl groups;

$R_2$ is hydrogen or a linear or branched $C_1$-$C_4$ alkyl group; and $R_4$ is hydrogen, a linear or branched $C_1$-$C_6$ alkyl group, halogen or nitro.

In the present invention, it is preferred that the composite ionic liquid contains the compound of formula III as the ionic liquid of the component B.

In the present invention, the linear or branched $C_1$-$C_4$ alkyl group represents a linear or branched alkyl group having 1 to 4 carbon atoms. Methyl, ethyl, n-propyl, isopropyl, n-butyl, sec-butyl, isobutyl and tert-butyl may be mentioned by way of example.

In the present invention, the linear or branched $C_1$-$C_5$ alkyl group represents a linear or branched alkyl group having 1 to 5 carbon atoms. Besides those mentioned for linear or branched $C_1$-$C_4$ alkyl group in the previous paragraph, n-pentyl, sec-pentyl and tert-pentyl can also be mentioned by way of example.

In the present invention, the linear or branched $C_1$-$C_6$ alkyl group represents a linear or branched alkyl group having 1 to 6 carbon atoms. Besides those mentioned for linear or branched $C_1$-$C_5$ alkyl group in the previous paragraph, n-hexyl, 2-methylpentyl, 3-methylpentyl, 2,2-dimethylbutyl and 2,3-dimethylbutyl can also be mentioned by way of example.

In the present invention, the linear or branched $C_1$-$C_8$ alkyl group represents a linear or branched alkyl group having 1 to 8 carbon atoms. Besides those mentioned for linear or branched $C_1$-$C_6$ alkyl group in the previous paragraph, n-heptyl and n-octyl can also be mentioned by way of example.

In the present invention, the linear or branched $C_1$-$C_{18}$ alkyl group represents a linear or branched alkyl group having 1 to 18 carbon atoms. Besides those mentioned for linear or branched $C_1$-$C_8$ alkyl group in the previous paragraph, n-nonyl, n-decyl, n-undecane, n-dodecane, n-tridecane, n-tetradecane, n-pentadecane, n-hexadecane, n-heptadecane and n-octadecane can also be mentioned by way of example.

In the present invention, halogen refers to fluorine, chlorine, bromine or iodine, preferably fluorine and chlorine.

In one preferred embodiment of the present invention, the zwitterionic compound as component A is preferably one or more selected from a group of methylimidazolium n-butylsulfonate (Mimbs), methylimidazolium n-propylsulfonate (Mimps), n-butylimidazolium n-butylsulfonate (Bimbs), pyridinium n-butylsulfonate (Pyrbs) and pyridinium n-propylsulfonate (Pyrps).

In one preferred embodiment of the present invention, the ionic liquid as component B is preferably one or more selected from a group of 1-isopropyl-3-methylimidazolium hexafluorophosphate (i-pmim $PF_6$), 1-isopropyl-3-methylimidazolium tetrafluoroborate (i-pmim $BF_4$), 1-ethyl-3-methylimidazolium hexafluorophosphate (emim $PF_6$), 1-n-propyl-3-methylimidazolium hexafluorophosphate (pmim $PF_6$), 1-n-butyl-3-methylimidazolium hexafluorophosphate (bmim $PF_6$), 1-n-hexyl-3-methylimidazolium hexafluorophosphate ($C_6$mim $PF_6$), 1-n-octyl-3-methylimidazolium hexafluorophosphate ($C_8$mim $PF_6$), 1,3-di-n-butylimidazolium hexafluorophosphate (bbim $PF_6$) and 1-benzyl-3-methylimidazolium trifluoromethylsulfonate (bemim OTf).

Hydroquinone and/or bisphenol A compound of the following formula V are preferably used as the bisphenol monomer for preparing polysulfone,

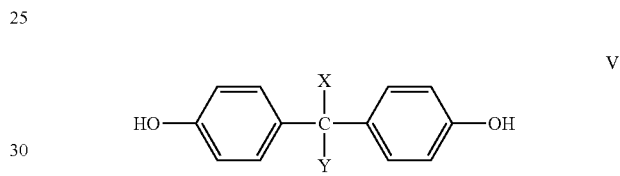

V wherein, X and Y are identical or different and independently from each other are H, a linear or branched $C_1$-$C_5$ alkyl group, or a linear or branched $C_1$-$C_5$ alkyl group mono- or polysubstituted by halogen, such as trifluoromethyl. A specially preferred bisphenol monomer is one or more selected from a group of hydroquinone, bisphenol A, bisphenol AF, bisphenol F, bisphenol S, 6,6-bis(4'-hydroxyphenyl)-undecane and 2,2-bis(4'-hydroxyphenyl)hexane.

To convert the bisphenol monomer into its salt, the salt forming agent used is a salt forming agent suitable to generate salt by reacting with the bisphenol monomer for preparation of polysulfone. For example, the salt forming agent can be one or more selected from the group consisting of potassium carbonate, sodium carbonate, potassium hydroxide and sodium hydroxide. In case that potassium hydroxide and/or sodium hydroxide are used as the salt forming agent, in order to obtain polysulfone with a high molecular weight, the amount of the salt forming agent should be controlled, because the salt forming agent being too much or too little is detrimental to the increase of molecular weight of polysulfone. Therefore, when potassium hydroxide and/or sodium hydroxide are used as the salt forming agent, the molar ratio of the salt forming agent to the bisphenol monomer is generally 2:1 to 3:1, preferably 2:1 to 2.2:1. However, in case that potassium carbonate and/or sodium carbonate are used as the salt forming agent, the amount of them exerts no significant influence on the molecular weight. Therefore, in the present invention, potassium carbonate and/or sodium carbonate are preferably used as the salt forming agent, thereby the molar ratio of the salt forming agent to the bisphenol monomer is generally 1:1 to 2:1, preferably 1.05:1 to 1.3:1.

4,4'-dihalodiphenyl sulfone is required as another monomer for preparation of polysulfone. It is preferred that 4,4'-dihalodiphenyl sulfone is 4,4'-dichlorodiphenyl sulfone, 4,4'-difluorodiphenyl sulfone or a mixture thereof. The inventors of the present invention discovered that use of 4,4'-difluorodiphenyl sulfone as the monomer for the preparation of polysulfone results in polysulfone with a much higher molecular weight in comparison to use of 4,4'-dichlorodiphenyl sulfone. Therefore, 4,4'-difluorodiphenyl sulfone is preferably used in the present invention for the preparation of polysulfone.

The molar amount of 4,4'-dihalodiphenyl sulfone is usually no more than that of the bisphenol monomer, a preferred molar ratio of 4,4'-dihalodiphenyl sulfone to the bisphenol monomer being 1:1 to 1:1.2, in particular in equivalent molar amount.

As to the composite ionic liquid according to the present invention, a mass ratio of the ionic liquid as component B to the ionic liquid as component A is generally 1:10 to 10:1, preferably, 1:1 to 3:1.

In the process of the present invention, a preferred mass ratio of the total amount of the composite ionic liquid to the total amount of the monomers is 1:1 to 3:1.

It is usually necessary to remove water from the salt forming reaction system before subjecting the bisphenolate, which is formed by the reaction between the bisphenol monomer and the salt forming agent, to polycondensation with 4,4'-dihalodiphenyl sulfone. A water entrainer is often used for that purpose. The water entrainer usually forms an azeotrope with water so as to be distilled off from the salt forming reaction system. It is preferred that the water entrainer is an organic solvent which forms an azeotrope with water under the condition for forming the bisphenolate. Toluene, chlorobenzene, cyclohexane, xylene or a mixture thereof is preferably used as the water entrainer. The water entrainer may be added before the salt forming reaction, after the salt forming reaction or at the end of the salt forming reaction. Correspondingly, the water removal operation may be performed simultaneously at the start of the salt forming reaction, or after the beginning of the salt forming reaction, or after the completion of the salt forming reaction. Since adding a water entrainer before the salt forming reaction may greatly reduce the operating procedures and shorten the time of water removal (water removal may be performed after the start of the salt forming reaction), hence the water entrainer is preferably added before the occurrence of the salt forming reaction, for example, added into the reaction vessel together with the salt forming agent.

The water entrainer is used at routine doses, as long as it enables removal of water from the reaction mixture. Generally speaking, the mass ratio of the total amount of the water entrainer to the total amount of the monomers is 2:1 to 5:1.

The inventors of the present invention further discovered that the process of the invention could be carried out by a one-pot two-step method with the aid of the composite ionic liquid of the invention, so as to avoid double-feeding, and hence greatly simplify operations and reduce problems such as potential damages to health of operating personnel, environmental pollution and the like caused by double-feeding; in addition, such operation likewise shortens the whole period of preparation.

Thus, in a specially preferred embodiment of the process of the present invention, the process is carried out by a one-pot two-step method as follows:

i) reacting the bisphenol monomer with the salt forming agent in a reaction vessel in the presence of 4,4'-dihalodiphenyl sulfone, the composite ionic liquid and a water entrainer to form bisphenolate, removing the formed water from the system with the aid of the water entrainer simultaneously at the start of the salt forming reaction, or after the beginning of the salt forming reaction, or after the completion of the salt forming reaction; or reacting the bisphenol monomer with the salt forming agent in a reaction vessel in the presence of 4,4'-dihalodiphenyl sulfone and the composite ionic liquid to form bisphenolate, adding a water entrainer at the same time during the salt forming reaction or after the completion of the salt forming reaction to remove the formed water from the system; and ii) subjecting the bisphenolate and 4,4'-dihalodiphenyl sulfone to polycondensation in the water-removed mixture from step i) in the same reaction vessel used in step i) to obtain polysulfone.

In the process of the present invention, the reaction between the bisphenol monomer and the salt forming agent is often performed at a temperature of 140 to 160° C. in the presence of the composite ionic liquid. The reaction proceeds under routine pressure, preferably under autogenic pressure. The reaction is carried out very quickly, which is usually accomplished within 5 to 10 min.

Water generated from the salt forming reaction should be removed to facilitate the subsequent polycondensation. Generally, the water removal operation may be performed simultaneously at the start of the salt forming reaction, or after the beginning of the salt forming reaction, or after the completion of the salt forming reaction. In case of the present invention, it usually takes 0.25 to 4.5 h, preferably 0.25 to 1.0 h, from the beginning of the salt forming reaction till the end of the water removal operation.

The reaction between the bisphenol monomer and the salt forming agent is carried out under routine atmosphere, preferably under an inert atmosphere exhibiting chemical inertness to that reaction, for example, in the presence of nitrogen gas.

The temperature of water removed reaction mixture is increased to the temperature for polycondensation of the bisphenolate and 4,4'-dihalodiphenyl sulfone, i.e. polycondensation can be carried out to obtain polysulfone. The polycondensation of bisphenolate and 4,4'-dihalodiphenyl sulfone is generally performed at 150 to 220° C. The reaction proceeds under routine pressure, preferably under autogenic pressure. The reaction is usually accomplished within 0.5 to 4 h, preferably within 0.8 to 1.5 h.

Polycondensation of the bisphenolate and 4,4'-dihalodiphenyl sulfone is carried out under routine atmosphere, preferably under an inert atmosphere exhibiting chemical inertness to polymerization, for example, in the presence of nitrogen gas.

In a specially preferred embodiment of the process of the present invention, this inventive process is carried out by a one-pot two-step method as follows:

a) reacting the bisphenol A compound of formula V with potassium carbonate and/or sodium carbonate as the salt forming agent in a reaction vessel in the presence of 4,4'-difluorodiphenyl sulfone, the composite ionic liquid and a water entrainer to form bisphenolate, removing the formed water from the system with the aid of the water entrainer simultaneously at the start of the salt forming reaction, or after the beginning of the salt forming reaction, or after the completion of the salt forming reaction, or reacting the bisphenol A compound of formula V with potassium carbonate and/or sodium carbonate as the salt forming agent in a reaction vessel in the presence of 4,4'-difluorodiphenyl sulfone and the composite ionic liquid to form bisphenolate, adding a water entrainer at the same time during the salt forming reaction or after the completion of the salt forming reaction to remove the formed water from the system; and b) subjecting the bisphenolate and 4,4'-difluorodiphenyl sulfone to polycondensation in the water-removed mixture from step a) in the same reaction vessel used in step a) to obtain polysulfone, wherein, the composite ionic liquid contains the compound of formula I as the ionic liquid of component A and the compound of formula III or IV as the ionic liquid of component B; the mass ratio of the total amount of the composite ionic liquid to the total amount of monomers is 1:1 to 3:1; and the mass ratio of the ionic liquid as component B to the ionic liquid as component A is 1:1 to 3:1.

After obtaining the resultant polysulfone, after-treatment is often required for that product. Such after-treatment is conventional to a person skilled in the art. In the process of the present invention, it is preferred that polysulfone resulting from polycondensation is subjected to after-treatment according to the following manner: adding 1 part by mass of the solid product resulting from polymerization directly into 5 to 20 parts by mass of boiling water, removing the inorganic salt generated in the reaction, suction filtering after multiple washing, vacuum drying preferably at 80 to 100° C. to give a crude product of polysulfone.

The preparation of polysulfone according to the process of the present invention, has advantages such as a shortened whole period of preparation, a reduced energy consumption, environmental friendliness; and the resultant polysulfone has a much higher molecular weight than polysulfone obtained by using routine organic solvent under similar conditions. Moreover, the use of the one-pot two-step method with the aid of the composite ionic liquid as the solvent, further avoids double-feeding, greatly simplifies the process, and reduces problems such as potential damages to health of operating personnel and environmental pollution and the like caused by double-feeding. Finally, the process of the present invention performed by using 4,4'-difluorodiphenyl sulfone as 4,4'-dihalodiphenyl sulfone, also results in polysulfone with a high molecular weight.

EXAMPLES

The present invention is further described hereinbelow in combination with examples. It should be pointed out that these examples only serve to exemplarily specify the process of the present invention rather than limit the scope thereof.

The reagents in the examples of the present invention were all commercially available analytical reagents.

PL-GPC50 from Polymer Laboratories was used for gel permeation chromatographic (GPC) analysis, in which the mobile phase was chloroform, the calibration curve was drawn by using monodispersed polystyrene standard samples (from Polymer Laboratories), with molecular weights respectively of 1,730,000, 591,2000, 238,700, 70,950, 24,600, 8,450, 2,900, 1,050 and 220.

Bruker Advance DRX-500 from Brucker Corporation was used for nuclear magnetic resonance (NMR) analysis.

OMNIC AVATAR 360 from Thermo Electron Corporation was used for Fourier Transform Infrared Spectroscopy (FTIR) analysis.

Example 1

Synthesis of Bisphenol a Polysulfone a) Formation of Bisphenol A Potassium Salt 0.639 g (0.0028 mol) of bisphenol A, 0.710 g (0.0028 mol) of 4,4'-difluorodiphenyl sulfone and 2.70 g of a composite ionic liquid [a mass ratio of 1-isopropyl-3-methylimidazolium hexafluorophosphate (i-pmim $PF_6$) to methylimidazolium n-butylsulfonate (Mimbs)=2:1] were added in a 100 ml four-neck round flask equipped with a thermometer, a stirrer and a condenser connected to a water separator. The mixture was subjected to evacuation and nitrogen flush repeatedly for 3 times, heated to 100° C. in a nitrogen atmosphere for 15 min to obtain a uniform solution system. Then the stirrer was started and the temperature was increased to 140° C. in 10 min, then 0.42 g (0.0030 mol) of potassium carbonate and 5 mL of toluene were added in one portion immediately, followed by heating to 150° C. in 5 min; a lot of bubbles were observed during this time, which indicated a violent salt forming reaction; water removal lasted for 0.5 h after the temperature reached 150° C.

b) Polycondensation in Ionic Liquid

Figure 2:
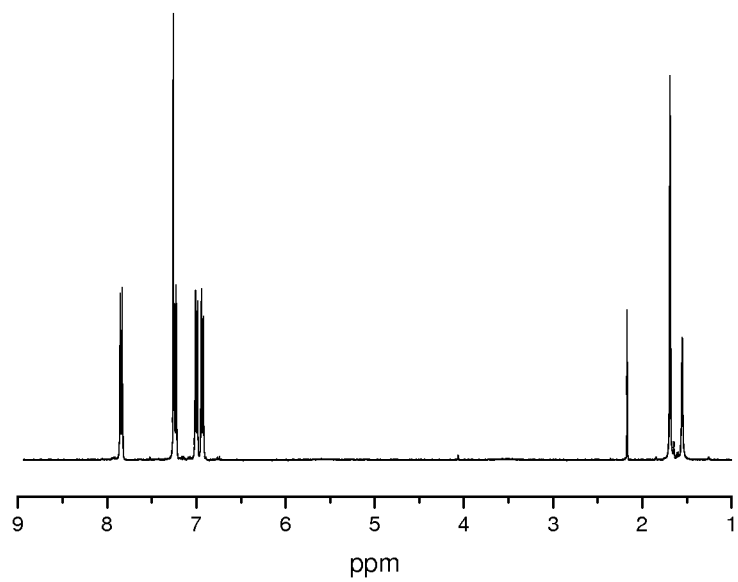
FIG. 2 is a $^1$H-NMR spectrum of bisphenol A polysulfone prepared in Example 1.

Toluene and the formed water were released from the water separator; without cooling, the system was increased to a temperature of 170° C. in 15 min and was then polymerized at this temperature in a nitrogen atmosphere for 1.5 h. The viscosity of the system rapidly increased at the initial period of polymerization, and a polymer was precipitated within 10 min. A tough white solid was obtained at the end of polymerization. The white solid product was cooled to room temperature and washed with boiling water for 6 times, suction filtered, and dried for 24 h in a vacuum baking oven under 80° C. to give a crude product, with a yield of 98.5%. The molecular weight and its distribution were measured by GPC. The weight average molecular weight of the crude product was 122,300, and the polydispersity index (i.e. the ratio of the weight average molecular weight to the number average molecular weight, similarly hereinafter) was 3.18. The crude product was subjected to Soxhlet extraction for 24 h using ethanol as the solvent, then dried for 24 h in a vacuum baking oven under 100° C. to give a purified product. The infrared spectrum of the purified product was shown in FIG. 1, and the $^1$H-NMR spectrum was shown in FIG. 2.

Example 2

The procedure as described in Example 1 was repeated, except that instead of 1-isopropyl-3-methylimidazolium hexafluorophosphate (i-pmim $PF_6$), 1-isopropyl-3-methylimidazolium bromide (i-pmim Br) was used. After purification and drying, the crude polysulfone had a yield of 98.7%, a weight average molecular weight of 39,000, and a polydispersity index of 2.60.

Example 3

The procedure as described in Example 1 was repeated, except that instead of 1-isopropyl-3-methylimidazolium hexafluorophosphate (i-pmim $PF_6$), 1-isopropyl-3-methylimidazolium tetrafluoroborate (i-pmim $BF_4$) was used. After purification and drying, the crude polysulfone had a yield of 96.4%, a weight average molecular weight of 51,300, and a polydispersity index of 2.80.

Example 4

The procedure as described in Example 1 was repeated, except that instead of 1-isopropyl-3-methylimidazolium hexafluorophosphate (i-pmim $PF_6$), 1,3-di-n-butylimidazolium hexafluorophosphate (bbim $PF_6$) was used. After purification and drying, the crude polysulfone had a yield of 98.4%, a weight average molecular weight of 90,800, and a polydispersity index of 3.00.

Example 5

The procedure as described in Example 1 was repeated, except that instead of 1-isopropyl-3-methylimidazolium hexafluorophosphate (i-pmim $PF_6$), 1-ethyl-3-methylimidazolium hexafluorophosphate (emim $PF_6$) was used. After purification and drying, the crude polysulfone had a yield of 97.3%, a weight average molecular weight of 85,400, and a polydispersity index of 2.27.

Example 6

The procedure as described in Example 1 was repeated, except that instead of 1-isopropyl-3-methylimidazolium hexafluorophosphate (i-pmim $PF_6$), 1-n-propyl-3-methylimidazolium hexafluorophosphate (pmim $PF_6$) was used. After purification and drying, the crude polysulfone had a yield of 96.9%, a weight average molecular weight of 74,300, and a polydispersity index of 2.27.

Example 7

The procedure as described in Example 1 was repeated, except that instead of 1-isopropyl-3-methylimidazolium hexafluorophosphate (i-pmim $PF_6$), 1-n-butyl-3-methylimidazolium hexafluorophosphate (bmim $PF_6$) was used. After purification and drying, the crude polysulfone had a yield of 95.9%, a weight average molecular weight of 63,400, and a polydispersity index of 2.52.

Example 8

The procedure as described in Example 1 was repeated, except that instead of 1-isopropyl-3-methylimidazolium hexafluorophosphate (i-pmim $PF_6$), 1-n-hexyl-3-methylimidazolium hexafluorophosphate ($C_6$mim $PF_6$) was used. After purification and drying, the crude polysulfone had a yield of 98.5%, a weight average molecular weight of 60,700, and a polydispersity index of 1.98.

Example 9

The procedure as described in Example 1 was repeated, except that instead of 1-isopropyl-3-methylimidazolium hexafluorophosphate (i-pmim $PF_8$), 1-n-octyl-3-methylimidazolium hexafluorophosphate ($C_8$mim $PF_6$) was used. After purification and drying, the crude polysulfone had a yield of 98.7%, a weight average molecular weight of 75,000, and a polydispersity index of 2.12.

Example 10

The procedure as described in Example 1 was repeated, except that instead of 4,4'-difluorodiphenyl sulfone (0.0028 mol) monomer, 4,4'-dichlorodiphenyl sulfone (0.0028 mol) was used. After purification and drying, the crude polysulfone had a yield of 89.4%, a weight average molecular weight of 17,000, and a polydispersity index of 2.07.

Example 11

The procedure as described in Example 1 was repeated, except that instead of methylimidazolium n-butylsulfonate, methylimidazolium n-propylsulfonate (Mimps) was used. After purification and drying, the crude polysulfone had a yield of 96.9%, a weight average molecular weight of 46,900, and a polydispersity index of 2.02.

Example 12

The procedure as described in Example 1 was repeated, except that instead of methylimidazolium n-butylsulfonate (Mimbs), n-butylimidazolium n-butylsulfonate (Bimbs) was used. After purification and drying, the crude polysulfone had a yield of 94.2%, a weight average molecular weight of 44,600, and a polydispersity index of 2.17.

Example 13

The procedure as described in Example 1 was repeated, except that the polycondensation temperature in step b) was changed from 170° C. to 160° C. After purification and drying, the crude polysulfone had a yield of 98.2%, a weight average molecular weight of 116,000, and a polydispersity index of 2.35.

Example 14

The procedure as described in Example 1 was repeated, except that the polycondensation temperature in step b) was changed from 170° C. to 160° C., and the polymerization was conducted for 0.5 h at this temperature in a nitrogen atmosphere. After purification and drying, the crude polysulfone had a yield of 96.5%, a weight average molecular weight of 48,400, and a polydispersity index of 2.64.

Example 15

The procedure as described in Example 1 was repeated, except that the polycondensation temperature in step b) was changed from 170° C. to 160° C., and the polymerization was conducted for 2.5 h at this temperature in a nitrogen atmosphere. After purification and drying, the crude polysulfone had a yield of 99.3%, a weight average molecular weight of 95,700, and a polydispersity index of 2.24.

Example 16

The procedure as described in Example 1 was repeated, except that the polycondensation temperature in step b) was changed from 170° C. to 160° C., and the polymerization was conducted for 3.5 h at this temperature in a nitrogen atmosphere. After purification and drying, the crude polysulfone had a yield of 98.8%, a weight average molecular weight of 95,600, and a polydispersity index of 2.24.

Example 17

The procedure as described in Example 1 was repeated, except that the amount of the composite ionic liquid was changed from 2.70 g to 2.025 g. After purification and drying, the crude polysulfone had a yield of 97.8%, a weight average molecular weight of 64,400, and a polydispersity index of 3.20.

Example 18

The procedure as described in Example 1 was repeated, except that the mass ratio of 1-isopropyl-3-methylimidazolium hexafluorophosphate (i-pmim $PF_6$) to methylimidazolium n-butylsulfonate (Mimbs) was changed from 2:1 to 3:1. After purification and drying, the crude polysulfone had a yield of 98.8%, a weight average molecular weight of 90,000, and a polydispersity index of 3.38.

Example 19

The procedure as described in Example 1 was repeated, except that the mass ratio of 1-isopropyl-3-methylimidazolium hexafluorophosphate (i-pmim $PF_6$) to methylimidazolium n-butylsulfonate (Mimbs) was changed from 2:1 to 2.5:1. After purification and drying, the crude polysulfone had a yield of 98.7%, a weight average molecular weight of 95,200, and a polydispersity index of 3.00.

Example 20

The procedure as described in Example 1 was repeated, except that the mass ratio of 1-isopropyl-3-methylimidazolium hexafluorophosphate (i-pmim $PF_6$) to methylimidazolium n-butylsulfonate (Mimbs) was changed from 2:1 to 1.5:1. After purification and drying, the crude polysulfone had a yield of 98.5%, a weight average molecular weight of 51,500, and a polydispersity index of 2.00.

Example 21

The procedure as described in Example 1 was repeated, except that the mass ratio of 1-isopropyl-3-methylimidazolium hexafluorophosphate (i-pmim $PF_6$) to methylimidazolium n-butylsulfonate (Mimbs) was changed from 2:1 to 1:2. After purification and drying, the crude polysulfone had a yield of 98.9%, a weight average molecular weight of 12,400, and a polydispersity index of 1.86.

Example 22

Synthesis of bisphenol AF polysulfone a) Formation of Bisphenol AF Potassium Salt 0.941 g (0.0028 mol) of bisphenol AF, 0.710 g (0.0028 mol) of 4,4'-difluorodiphenyl sulfone and 3.303 g of a composite ionic liquid [a mass ratio of 1-isopropyl-3-methylimidazolium hexafluorophosphate (i-pmim $PF_6$) to methylimidazolium n-butylsulfonate=2:1] were added in a 100 ml four-neck round flask equipped with a thermometer, a stirrer and a condenser connected to a water separator. The mixture was subjected to evacuation and nitrogen flush repeatedly for 3 times, heated to 100° C. in a nitrogen atmosphere for 15 min to obtain a uniform solution system. Then the stirrer was started and the temperature was increased to 140° C. in 10 min, then 0.42 g (0.0030 mol) of potassium carbonate and 5 mL of toluene were added in one portion immediately, followed by heating to 150° C. in 5 min; water removal lasted for 0.5 h after the temperature reached 150° C.

b) Polycondensation in Ionic Liquid

Toluene and the formed water were released from the water separator; without cooling, the system was increased to a temperature of 190° C. in 25 min and was then polymerized at this temperature in a nitrogen atmosphere for 1.5 h. A polymer was precipitated, and a white fibrous solid was obtained. The white solid product was cooled to room temperature and washed with boiling water for 6 times, suction filtered, and dried for 24 h in a vacuum baking oven under 80° C. to give a crude product, with a yield of 98.6%. The molecular weight and its distribution were measured by GPC. The weight average molecular weight of the resultant crude product was 59,500, and the polydispersity index was 1.83.

Example 23

Synthesis of Bisphenol S Polysulfone a) Formation of Bisphenol S Potassium Salt 0.702 g (0.0028 mol) of bisphenol S, 0.710 g (0.0028 mol) of 4,4'-difluorodiphenyl sulfone and 2.70 g of a composite ionic liquid [a mass ratio of 1-isopropyl-3-methylimidazolium hexafluorophosphate (i-pmim $PF_6$) to methylimidazolium n-butylsulfonate=1:1] were added in a 100 ml four-neck round flask equipped with a thermometer, a stirrer and a condenser connected to a water separator. The mixture was subjected to evacuation and nitrogen flush repeatedly for 3 times, heated to 100° C. in a nitrogen atmosphere for 15 min to obtain a uniform solution system. Then the stirrer was started and the temperature was increased to 140° C. in 10 min, then 0.42 g (0.0030 mol) of potassium carbonate and 5 mL of toluene were added in one portion immediately, followed by heating to 150° C. in 5 min; water removal lasted for 0.5 h after the temperature reached 150° C.

b) Polycondensation in Ionic Liquid

Toluene and the formed water were released from the water separator; without cooling, the system was increased to a temperature of 190° C. in 25 min and was then polymerized at this temperature in a nitrogen atmosphere for 2 h. A polymer was precipitated, and then cooled to room temperature to give a yellowish solid which could hardly be crushed. The yellowish solid product was washed with boiling water for 6 times, suction filtered, then subjected to Soxhlet extraction for 24 h using ethanol as the solvent, then dried for 24 h in a vacuum baking oven under 100° C. to give a purified product, with a yield of 96.9%. The molecular weight and its distribution were measured by GPC. The weight average molecular weight of the purified product was 63,500, and the polydispersity index was 2.01.

Example 24

Synthesis of Hydroquinone Polysulfone a) Formation of Bisphenol Potassium Salt 0.31 g (0.0028 mol) of hydroquinone, 0.710 g (0.0028 mol) of 4,4'-difluorodiphenyl sulfone and 2.8 g of a composite ionic liquid [a mass ratio of 1-isopropyl-3-methylimidazolium hexafluorophosphate (i-pmim $PF_6$) to methylimidazolium n-butylsulfonate=2:1] were added in a 100 ml four-neck round flask equipped with a thermometer, a stirrer and a condenser connected to a water separator. The mixture was subjected to evacuation and nitrogen flush repeatedly for 3 times, heated to 100° C. in a nitrogen atmosphere for 15 min to obtain a uniform solution system. Then the stirrer was started and the temperature was increased to 140° C. in 10 min, then 0.42 g (0.0030 mol) of potassium carbonate and 3 mL of toluene were added in one portion immediately, followed by heating to 150° C. in 5 min; water removal lasted for 0.5 h after the temperature reached 150° C.

b) Polycondensation in Ionic Liquid

Toluene and the formed water were released from the water separator; without cooling, the system was increased to a temperature of 220° C. in 35 min and was then polymerized at this temperature in a nitrogen atmosphere for 3 h. A solid was precipitated during the polymerization, which was cooled to room temperature after the completion of polymerization to give off-white solid powders. The solid product was washed with boiling water for 6 times, suction filtered, then subjected to Soxhlet extraction using ethanol as the solvent, then dried for 24 h in a vacuum baking oven under 80° C. to give a purified product, with a yield of 87.9%. Its intrinsic viscosity was measured by a Ubbelohde viscometer as 0.41 dL/g.

Example 25

The procedure as described in Example 1 was repeated, except that instead of 1-isopropyl-3-methylimidazolium hexafluorophosphate (i-pmim $PF_6$), 4-methylbenzylpyrrolidinehexafluorophosphate (4-mbpy $PF_6$) was used. After purification and drying, the crude polysulfone had a yield of 90.5%, a weight average molecular weight of 18,400, and a polydispersity index of 2.92.

Example 26

The procedure as described in Example 1 was repeated, except that instead of 1-isopropyl-3-methylimidazolium hexafluorophosphate (i-pmim $PF_6$), 1-benzyl-3-methylimidazolium trifluoromethylsulfonate (bemim OTf) was used. After purification and drying, the crude polysulfone had a yield of 98.7%, a weight average molecular weight of 44,500, and a polydispersity index of 2.68.

Example 27

The procedure described in Example 1 was repeated, except that 0.314 g (0.0056 mol) of solid potassium hydroxide was used as the salt forming agent. After purification and drying, the crude polysulfone had a yield of 92.1%, a weight average molecular weight of 47,500, and a polydispersity index of 2.39.

Comparative Example 1

Use of an Organic Solvent

In the comparative example, the composite ionic liquid was replaced by a traditional solvent N,N-dimethylacetamide (DMAc) used for preparation of polysulfone.
a) Formation of Bisphenol A Potassium Salt
  0.639 g (0.0028 mol) of bisphenol A, 0.710 g (0.0028 mol) of 4,4'-difluorodiphenyl sulfone and 2.70 g of N,N-dimethylacetamide (DMAc) were added in a 100 ml four-neck round flask equipped with a thermometer, a stirrer and a condenser connected to a water separator. The mixture was subjected to evacuation and nitrogen flush repeatedly for 3 times, heated to 100° C. in a nitrogen atmosphere for 15 min to obtain a uniform solution system. Then the stirrer was started and the temperature was increased to 140° C. in 10 min, then 0.42 g (0.0030 mol) of potassium carbonate and 5 mL of toluene were added in one portion immediately, followed by heating to 150° C. in 5 min. Potassium carbonate deposited at the bottom of the reaction vessel could be observed during this time. Water removal lasted for 0.5 h after the temperature reached 150° C.
b) Polycondensation in a Traditional Solvent
  Toluene and the formed water were released from the water separator; without cooling, the system was increased to a temperature of 170° C. in 15 min and was then polymerized at this temperature in a nitrogen atmosphere for 1.5 h. A white solid was precipitated from the system at the initial period of polymerization, and a solid paste was obtained at the end of polymerization. The white solid product was cooled to room temperature and washed with boiling water for 6 times, suction filtered, and dried for 24 h in a vacuum baking oven under 80° C. to give a crude product, with a yield of 77.5%. The molecular weight and its distribution were measured by GPC. The weight average molecular weight of the crude product was 27,900, and the polydispersity index was 2.07.

Comparative Example 2 a) Formation of Bisphenol a Potassium Salt 0.639 g (0.0028 mol) of bisphenol A, 0.710 g (0.0028 mol) of 4,4'-difluorodiphenyl sulfone and 2.70 g of N-methylpyrrolidinone (NMP) were added in a 100 ml four-neck round flask equipped with a thermometer, a stirrer and a condenser connected to a water separator. The mixture was subjected to evacuation and nitrogen flush repeatedly for 3 times, heated to 100° C. in a nitrogen atmosphere for 15 min to obtain a uniform solution system. Then the stirrer was started and the temperature was increased to 140° C. in 10 min, then 0.42 g (0.0030 mol) of potassium carbonate and 5 mL of toluene were added in one portion immediately, followed by heating to 150° C. in 5 min. Potassium carbonate deposited at the bottom of the reaction vessel could be observed during this time. Water removal lasted for 4.5 h after the temperature reached 150° C.

b) Polycondensation in a Traditional Solvent

Toluene and the formed water were released from the water separator; without cooling, the system was increased to a temperature of 178° C. in 20 min and was then polymerized at this temperature in a nitrogen atmosphere for 4 h to give a viscous liquid which, while still hot, was poured into a large amount of methanol for precipitation. The precipitate thus obtained was suction filtered to give a white filter cake; the filter cake was washed with boiling water for 6 times, suction filtered, and dried for 24 h in a vacuum baking oven under 80° C. to give a crude product, with a yield of 87.5%. The molecular weight and its distribution were measured by GPC. The weight average molecular weight of the crude product was 34,300, and the polydispersity index was 3.73.

Comparative Example 3 a) Formation of Bisphenol A Potassium Salt 0.639 g (0.0028 mol) of bisphenol A, 0.710 g (0.0028 mol) of 4,4'-difluorodiphenyl sulfone and 2.70 g of dimethyl sulfoxide (DMSO) were added in a 100 ml four-neck round flask equipped with a thermometer, a stirrer and a condenser connected to a water separator. The mixture was subjected to evacuation and nitrogen flush repeatedly for 3 times, heated to 100° C. in a nitrogen atmosphere for 15 min to obtain a uniform solution system. Then the stirrer was started and the temperature was increased to 140° C. in 10 min, then 0.42 g (0.0030 mol) of potassium carbonate and 5 mL of toluene were added in one portion immediately, followed by heating to 150° C. in 5 min. Potassium carbonate deposited at the bottom of the reaction vessel could be observed during this time. Water removal lasted for 8.5 h after the temperature reached 150° C.

b) Polycondensation in a Traditional Solvent

Toluene and the formed water were released from the water separator; without cooling, the system was increased to a temperature of 170° C. in 20 min and was then polymerized at this temperature in a nitrogen atmosphere for 2 h to give a viscous liquid which, while still hot, was poured into a large amount of methanol for precipitation. The precipitate thus obtained was suction filtered to give a white filter cake; the filter cake was washed with boiling water for 6 times, suction filtered, and dried for 24 h in a vacuum baking oven under 80° C. to give a crude product, with a yield of 97.5%. The molecular weight and its distribution were measured by GPC. The weight average molecular weight of the crude product was 65,200, and the polydispersity index was 3.84.

Comparative Example 4

The procedure as described in Example 1 was repeated, except that instead of the composite ionic liquid, 1-isopropyl-3-methylimidazolium hexafluorophosphate (i-pmim $PF_6$) (2.70 g) was used. After purification and drying, the crude polysulfone had a yield of 95.5%, a weight average molecular weight of 7,400, and a polydispersity index of 2.53.

Comparative Example 5

The procedure as described in Example 1 was repeated, except that instead of the composite ionic liquid, methylimidazolium n-butylsulfonate (Mimbs) (2.70 g) was used. After purification and drying, the crude polysulfone had a yield of 94.6%, a weight average molecular weight of 8,000, and a polydispersity index of 2.09.

The invention claimed is:
1. A process for preparing polysulfone, comprising reacting bisphenol monomers with a salt forming agent to form bisphenolate, followed by subjecting the bisphenolate and 4,4'-dihalodiphenyl sulfone to polycondensation to give polysulfone, characterized in that the reaction for forming the bisphenolate and the polycondensation are performed in the presence of a composite ionic liquid as the solvent, the composite ionic liquid containing:
A) at least one zwitterionic liquid selected from compounds of the following formulae I and II:

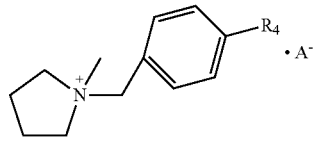

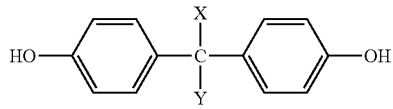

wherein,
n and m independently from each other are an integer of from 1 to 6; and
R is a linear or branched $C_1$-$C_6$ alkyl group,
and
B) at least one ionic liquid selected from compounds of the following formulae III and IV:

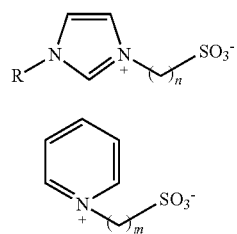

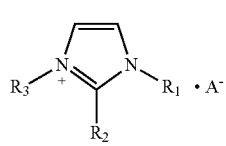

wherein,
$A^-$ represents an anion in the ionic liquid, which is $Cl^-$, $Br^-$, $BF_4^-$, $PF_6^-$, $[CF_3SO_3]^-$, $(CF_3SO_2)_2N^-$, $CF_3COO^-$, $[AlCl_4]^-$, $(CF_3SO_2)_2C^-$, $CF_3CF_2CF_2SO_3^-$ or $CF_3CF_2CF_2COO^-$;
$R_1$ and $R_3$ independently from each other are linear or branched $C_1$-$C_{18}$ alkyl groups or benzyl;
$R_2$ is hydrogen or a linear or branched $C_1$-$C_4$ alkyl group; and
$R_4$ is hydrogen, a linear or branched $C_1$-$C_6$ alkyl group, halogen or nitro.
2. The process of claim 1, in which the bisphenol monomer is hydroquinone and/or bisphenol A compound of the following formula V:

wherein, X and Y are identical or different and independently from each other are H, a linear or branched $C_1$-$C_5$ alkyl group, or a linear or branched $C_1$-$C_5$ alkyl group mono- or polysubstituted by halogen.
3. The process of claim 1, in which the salt forming agent is one or more selected from a group of potassium carbonate, sodium carbonate, potassium hydroxide and sodium hydroxide.
4. The process of claim 1, wherein 4,4'-dihalodiphenyl sulfone is 4,4'-dichlorodiphenyl sulfone, 4,4'difluorodiphenyl sulfone or a mixture thereof.
5. The process of claim 1, in which
the ionic liquid as the component A is one or more selected from a group of methylimidazolium n-butylsulfonate (Mimbs), methylimidazolium n-propylsulfonate (Mimps), n-butylimidazolium n-butylsulfonate (Bimbs), pyridinium n-butylsulfonate (Pyrbs) and pyridinium n-propylsulfonate (Pyrps); and/or
the ionic liquid as the component B is one or more selected from a group of 1-isopropyl-3-methylimidazolium hexafluorophosphate (i-pmim $PF_6$), 1-isopropyl-3-methylimidazolium tetrafluoroborate (i-pmim $BF_4$), 1-ethyl-3-methylimidazolium hexafluorophosphate (emim $PF_6$), 1-n-propyl-3-methylimidazolium hexafluorophosphate (pmim $PF_6$), 1-n-butyl-3-methylimidazolium hexafluorophosphate (bmim $PF_6$), 1-n-hexyl-3-methylimidazolium hexafluorophosphate ($C_6$mim $PF_6$), 1-n-octyl-3-methylimidazolium hexafluorophosphate ($C_8$mim $PF_6$), 1,3-di-n-butylimidazolium hexafluorophosphate (bbim $PF_6$) and 1-benzyl-3-methylimidazolium trifluoromethylsulfonate (bemim OTf).
6. The process of claim 2, in which
the ionic liquid as the component A is one or more selected from a group of methylimidazolium n-butylsulfonate (Mimbs), methylimidazolium n-propylsulfonate (Mimps), n-butylimidazolium n-butylsulfonate (Bimbs), pyridinium n-butylsulfonate (Pyrbs) and pyridinium n-propylsulfonate (Pyrps); and/or the ionic liquid as the component B is one or more selected from a group of 1-isopropyl-3-methylimidazolium hexafluorophosphate (i-pmim $PF_6$), 1-isopropyl-3-methylimidazolium tetrafluoroborate (i-pmim $BF_4$), 1-ethyl-3-methylimidazolium hexafluorophosphate (emim $PF_6$), 1-n-propyl-3-methylimidazolium hexafluorophosphate (pmim $PF_6$), 1-n-butyl-3-methylimidazolium hexafluorophosphate (bmim $PF_6$), 1-n-hexyl-3-methylimidazolium hexafluorophosphate ($C_6$mim $PF_6$), 1-n-octyl-3-methylimidazolium hexafluorophosphate ($C_8$mim $PF_6$), 1,3-di-n-butylimidazolium hexafluorophosphate (bbim $PF_6$) and 1-benzyl-3-methylimidazolium trifluoromethylsulfonate (bemim OTf).

7. The process of claim 3, in which
the ionic liquid as the component A is one or more selected from a group of methylimidazolium n-butylsulfonate (Mimbs), methylimidazolium n-propylsulfonate (Mimps), n-butylimidazolium n-butylsulfonate (Bimbs), pyridinium n-butylsulfonate (Pyrbs) and pyridinium n-propylsulfonate (Pyrps); and/or the ionic liquid as the component B is one or more selected from a group of 1-isopropyl-3-methylimidazolium hexafluorophosphate (i-pmim $PF_6$), 1-isopropyl-3-methylimidazolium tetrafluoroborate (i-pmim $BF_4$), 1-ethyl-3-methylimidazolium hexafluorophosphate (emim $PF_6$), 1-n-propyl-3-methylimidazolium hexafluorophosphate (pmim $PF_6$), 1-n-butyl-3-methylimidazolium hexafluorophosphate (bmim $PF_6$), 1-n-hexyl-3-methylimidazolium hexafluorophosphate ($C_6$mim $PF_6$), 1-n-octyl-3-methylimidazolium hexafluorophosphate ($C_8$mim $PF_6$), 1,3-di-n-butylimidazolium hexafluorophosphate (bbim $PF_6$) and 1-benzyl-3-methylimidazolium trifluoromethylsulfonate (bemim OTf).

8. The process of claim 4, in which
the ionic liquid as the component A is one or more selected from a group of methylimidazolium n-butylsulfonate (Mimbs), methylimidazolium n-propylsulfonate (Mimps), n-butylimidazolium n-butylsulfonate (Bimbs), pyridinium n-butylsulfonate (Pyrbs) and pyridinium n-propylsulfonate (Pyrps); and/or the ionic liquid as the component B is one or more selected from a group of 1-isopropyl-3-methylimidazolium hexafluorophosphate (i-pmim $PF_6$), 1-isopropyl-3-methylimidazolium tetrafluoroborate (i-pmim $BF_4$), 1-ethyl-3-methylimidazolium hexafluorophosphate (emim $PF_6$), 1-n-propyl-3-methylimidazolium hexafluorophosphate (pmim $PF_6$), 1-n-butyl-3-methylimidazolium hexafluorophosphate (bmim $PF_6$), 1-n-hexyl-3-methylimidazolium hexafluorophosphate ($C_6$mim $PF_6$), 1-n-octyl-3-methylimidazolium hexafluorophosphate ($C_8$mim $PF_6$), 1,3-di-n-butylimidazolium hexafluorophosphate (bbim $PF_6$) and 1-benzyl-3-methylimidazolium trifluoromethylsulfonate (bemim OTf).

9. The process of claim 1, wherein the process is carried out by a one-pot two-step method as follows:

i) reacting the bisphenol monomer with the salt forming agent in a reaction vessel in the presence of 4,4'-dihalodiphenyl sulfone, the composite ionic liquid and a water entrainer to form bisphenolate, removing the formed water from the system with the aid of the water entrainer simultaneously at the start of the salt forming reaction, or after the beginning of the salt forming reaction, or after the completion of the salt forming reaction; or reacting the bisphenol monomer with the salt forming agent in a reaction vessel in the presence of 4,4'-dihalodiphenyl sulfone and the composite ionic liquid to form bisphenolate, adding a water entrainer at the same time during the salt forming reaction or after the completion of the salt forming reaction to remove the formed water from the system; and ii) subjecting the bisphenolate and 4,4'-dihalodiphenyl sulfone to polycondensation in the water-removed mixture from step i) in the same reaction vessel used in step i) to obtain polysulfone.

10. The process of claim 9, wherein the water entrainer is an organic solvent which forms an azeotrope with water under the condition for bisphenolate formation.

11. The process of claim 1, wherein the molarratio of 4,4'-dihalodiphenyl sulfone to the bisphenol monomer is 1:1 to 1:1.2.

12. The process of claim 1, wherein the mass ratio of the ionic liquid as component B to the ionic liquid as component A is 1:10 to 10:1, and/or the mass ratio of the total amount of the composite ionic liquid to the total amount of monomers is 1:1 to 3:1.

13. The process of claim 1, wherein the reaction of bisphenolate formation is performed at 140 to 160° C., and/or the polycondensation of bisphenolate and 4,4'-dihalodiphenyl sulfone is performed at 150 to 220° C.

14. The process of claim 9, wherein the total time of bisphenolate formation and water removal is 0.25 h to 4.5 h; and the time of polycondensation of bisphenolate and 4,4'-dihalodiphenyl sulfone is 0.5 to 4 h.

15. The process of claim 2, wherein the process is carried out by a one-pot two-step method as follows:

a) reacting the bisphenol A compound of formula V with potassium carbonate and/or sodium carbonate as the salt forming agent in a reaction vessel in the presence of 4,4'-difluorodiphenyl sulfone, the composite ionic liquid and a water entrainer to form bisphenolate, removing the formed water from the system with the aid of the water entrainer simultaneously at the start of the salt forming reaction, or after the beginning of the salt forming reaction, or after the completion of the salt forming reaction, or reacting the bisphenol A compound of formula V with potassium carbonate and/or sodium carbonate as the salt forming agent in a reaction vessel in the presence of 4,4'-difluorodiphenyl sulfone and the composite ionic liquid to form bisphenolate, adding a water entrainer at the same time during the salt forming reaction or after the completion of the salt forming reaction to remove the formed water from the system; and b) subjecting the bisphenolate and 4,4'-difluorodiphenyl sulfone to polycondensation in the water-removed mixture from step a) in the same reaction vessel used in step a) to obtain polysulfone, wherein, the composite ionic liquid contains the compound of formula I as the ionic liquid of component A and the compound of formula III or IV as the ionic liquid of component B; the mass ratio of the total amount of the composite ionic liquid to the total amount of monomers is 1:1 to 3:1; and the mass ratio of the ionic liquid as component B to the ionic liquid as component A is 1:1 to 3:1.

16. The process of claim 12, wherein the mass ratio of the ionic liquid as component B to the ionic liquid as component A is 1:1 to 3:1.

17. The process of claim 14, wherein the total time of bisphenolate formation and water removal is 0.25 to 1.0 h; and the time of polycondensation of bisphenolate and 4,4'-dihalodiphenyl sulfone is 0.8 to 1.5 h.

18. The process of claim 1, wherein the composite ionic liquid contains the compound of formula I as the ionic liquid of component A and the compound of formula III or IV as the ionic liquid of component B.

19. The process of claim 2, wherein the bisphenol monomer is one or more selected from a group of hydroquinone, bisphenol A, bisphenol AF, bisphenol F, bisphenol S, 6,6-bis(4'-hydroxyphenyl)-undecane and 2,2-bis(4'-hydroxyphenyl)hexane.

20. The process of claim 3, wherein the salt forming agent is one or more selected from a group of potassium carbonate, sodium carbonate or a mixture of potassium carbonate and sodium carbonate, with the molar ratio of the salt forming agent to the bisphenol monomer being 1:1 to 2:1.

21. The process of claim 10, wherein the water entrainer is toluene, chlorobenzene, cyclohexane, xylene or a mixture thereof.

* * * * *